US011623396B2

(12) United States Patent
Duoss et al.

(10) Patent No.: US 11,623,396 B2
(45) Date of Patent: Apr. 11, 2023

(54) SYSTEM AND METHOD FOR ROLL-TO-ROLL FILM TENSIONING FOR REDUCED SEPARATION FORCE DURING BOTTOM-UP STEREOLITHOGRAPHY

(71) Applicants: Lawrence Livermore National Security, LLC, Livermore, CA (US); Board of Regents, The University of Texas System, Austin, TX (US)

(72) Inventors: Eric B. Duoss, Danville, CA (US); James Oakdale, Castro Valley, CA (US); Nicholas Anthony Rodriguez, Austin, TX (US); Hongtao Song, Austin, TX (US); Richard Crawford, Austin, TX (US); Carolyn Seepersad, Austin, TX (US); Morgan Chen, Richardson, TX (US)

(73) Assignees: Lawrence Livermore National Security, LLC, Livermore, CA (US); Board of Regents, The University of Texas System, Austin, TX (US)

( * ) Notice: Subject to any disclaimer, the term of this patent is extended or adjusted under 35 U.S.C. 154(b) by 121 days.

(21) Appl. No.: 17/028,543

(22) Filed: Sep. 22, 2020

(65) Prior Publication Data
US 2022/0088868 A1    Mar. 24, 2022

(51) Int. Cl.
*B29C 64/245* (2017.01)
*B33Y 30/00* (2015.01)
(Continued)

(52) U.S. Cl.
CPC .......... *B29C 64/245* (2017.08); *B29C 64/214* (2017.08); *B29C 64/264* (2017.08);
(Continued)

(58) Field of Classification Search
CPC ... B29C 64/245; B29C 64/124; B29C 64/214; B29C 64/264; B29C 64/393; B29K 2901/12; B33Y 30/00; B33Y 50/01
(Continued)

(56) References Cited

U.S. PATENT DOCUMENTS 5,306,446 A * 4/1994 Howe ..................... B29C 41/12
264/401
6,159,411 A * 12/2000 Kulkarni ................. B29C 41/12
425/375
(Continued)

FOREIGN PATENT DOCUMENTS

EP    2241430 B1    11/2012
KR    20160058770 A    5/2016

OTHER PUBLICATIONS

Al-Turaif, H. A. (2010). Effect of nano $TiO_2$ particle size on mechanical properties of cured epoxy resin. *Progress in Organic Coatings*, 69(3), 241-246.
(Continued)

*Primary Examiner* — Joseph S Del Sole
*Assistant Examiner* — Lawrence D. Hohenbrink, Jr.
(74) *Attorney, Agent, or Firm* — Harness, Dickey & Pierce, P.L.C.

(57) ABSTRACT

The present disclosure relates to a tensioning system for use in a stereolithography manufacturing application. The system may have a build plate for supporting a three dimensional part being formed using a photo responsive resin, a base plate and a release element extending over the base plate. The release element is configured to receive a quantity of photo responsive resin for forming a new material layer of the three dimensional part. A pair of tensioning components are secured to opposite ends of the release element, and apply a controlled tension force to the release element during peeling of the release element to reduce a separation
(Continued)

force required to separate the release element from the new material layer after the new material layer is cured.

19 Claims, 8 Drawing Sheets

(51) Int. Cl.
| | |
|---|---|
| B33Y 50/02 | (2015.01) |
| B29C 64/264 | (2017.01) |
| B29C 64/393 | (2017.01) |
| B29C 64/214 | (2017.01) |
| B29C 64/124 | (2017.01) |

(52) U.S. Cl.
CPC ............ *B29C 64/393* (2017.08); *B33Y 30/00* (2014.12); *B33Y 50/02* (2014.12); *B29C 64/124* (2017.08); *B29K 2901/12* (2013.01)

(58) Field of Classification Search
USPC .................................. 425/162, 375; 264/308
See application file for complete search history.

(56) References Cited

U.S. PATENT DOCUMENTS

| | | | |
|---|---|---|---|
| 9,120,270 | B2 | 9/2015 | Chen et al. |
| 2011/0089610 | A1* | 4/2011 | El-Siblani ............. B29C 64/188 425/89 |
| 2015/0360419 | A1 | 12/2015 | Willis et al. |
| 2019/0240968 | A1 | 8/2019 | Thomas et al. |

OTHER PUBLICATIONS

Chang, C.-W., van Spreeuwel, A., Zhang, C., & Varghese, S. (2010). PEG/clay nanocomposite hydrogel: a mechanically robust tissue engineering scaffold. *Soft Matter*, 6(20), 5157-5164.
Chen, Q., Xu, R., He, Z., Zhao, K., & Pan, L. (2017). Printing 3D Gel Polymer Electrolyte in Lithium-Ion Microbattery Using Stereolithography. *Journal of The Electrochemical Society*, 164(9), A1852-A1857.
Choi, J.-W., Kim, H.-C., and Wicker, R. (2011). Multi-material stereolithography. *Journal of Materials Processing Technology*, 211(3), 318-328.
Dhananjay, D., Pregibon, D. C., Collins, J., Hatton, T. A., & Doyle, P. S. (2006). Continuous-flow lithography for high-throughput microparticle synthesis. *Nature materials*, 5(5), 365-369.
Du, J., Lindeman, D., & Yarusso, D. (2004). Modeling The Peel Performance Of Pressure-Sensitive Adhesives. *The Journal of Adhesion*, 80(7), 601-612.
Halloran, J. W. (2016). Ceramic Stereolithography: Additive Manufacturing For Ceramics By Photopolymerization. *Annual Review of Materials Research*, 46, 19-40.
He, H., Xu, J., Yu, X., and Pan, Y. (2018). Effect Of Constrained Surface Texturing On Separation Force In Projection Stereolithography. *Journal of Manufacturing Science and Engineering*, 140(9).
He, L., and Song, X. (2018). Supportability Of A High-Yield-Stress Slurry In A New Stereolithography-Based Ceramic Fabrication Process. *Jom*, 70(3), 407-412.
Hu, K., Wei, Y., Lu, Z., Wan, L., & Li, P. (2018). Design Of A Shaping System For Stereolithography With High Solid Loading Ceramic Suspensions. *3D Printing and Additive Manufacturing*, 5(4), 311-318.
Jia, Q., Zheng, M., Xu, C., & Chen, H. (2006). The mechanical properties and tribological behavior of epoxy resin composites modified by different shape nanofillers. *Polymers for advanced technologies*, 17(3), 168-173.
Jin, J., Yang, J., Mao, H., & Chen, Y. (2018). A vibration-assisted method to reduce separation force for stereolithography. *Journal of Manufacturing Processes*, 34, 793-801.

Kendall, K. (1971). The adhesion and surface energy of elastic solids. *Journal of Physics D: Applied Physics*, 4(8), 1186.
Kendall, K. (1975). Thin-film peeling—the elastic term. *Journal of Physics D: Applied Physics*, 8(13), 1449.
Kovalchick, C. (2011). *Mechanics Of Peeling: Cohesive Zone Law And Stability:* California Institute of Technology.
Lin, Y., & Yang, C. (2017). *Design And Fabrication Of A Self-Adjusted Mechanism In Combination With Passive Peeling For Effective Separation Used In Digital Light Processing (DLP) 3D Printing*. Paper presented at the 126th International Conference on Recent Innovation in Engineering and Technology (ICRIET), *International Journal of Mechanical and Production Engineering*, ISSN: 2320-2092, vol. 5, Issue 3, 10-14.
Liravi, F., Das, S., & Zhou, C. (2014). *Separation Force Analysis Based On Cohesive Delamination Model For Bottom-Up Stereolithography Using Finite Element Analysis*. Paper presented at the 25th Annual International Solid Freeform Fabrication Symposium, 1432-1451.
Manapat, J. Z., Chen, Q., Ye, P., & Advincula, R. C. (2017). 3D Printing Of Polymer Nanocomposites Via Stereolithography. *Macromolecular Materials and Engineering*, 302(9), 1600553.
Maruo, S., & Ikuta, K. (2002). Submicron stereolithography for the production of freely movable mechanisms by using single-photon polymerization. *Sensors and Actuators A: Physical*, 100(1), 70-76.
Melchels, F. P., Feijen, J., & Grijpma, D. W. (2010). A review on stereolithography and its applications in biomedical engineering. *Biomaterials*, 31(24), 6121-6130.
Morris, V. B., Nimbalkar, S., Younesi, M., McClellan, P., & Akkus, O. (2017). Mechanical Properties, Cytocompatibility And Manufacturability Of Chitosan: PEGDA Hybrid-Gel Scaffolds By Stereolithography. *Annals of biomedical engineering*, 45(1), 286-296.
Nunes, R. W., Martin, J. R., & Johnson, J. F. (1982). Influence Of Molecular Weight And Molecular Weight Distribution On Mechanical Properties Of Polymers. *Polymer Engineering & Science*, 22(4), 205-228.
Pan, Y., He, H., Xu, J., & Feinerman, A. (2017). Study of separation force in constrained surface projection stereolithography. *Rapid Prototyping Journal*, vol. 23, Issue 2, 353-361.
Pan, Y., Zhou, C., & Chen, Y. (2012). A Fast Mask Projection Stereolithography Process For Fabricating Digital Models In Minutes. *Journal of Manufacturing Science and Engineering*, 134(5).
Peng, Z., Wang, C., Chen, L., & Chen, S. (2014). Peeling behavior of a viscoelastic thin-film on a rigid substrate. *International Journal of Solids and Structures*, 51(25-26), 4596-4603.
Sakly, A., Kenzari, S., Bonina, D., Corbel, S., & Fournée, V. (2014). A novel quasicrystal-resin composite for stereolithography. *Materials & Design (1980-2015)*, 56, 280-285.
Song, X., Chen, Y., Lee, T. W., Wu, S., & Cheng, L. (2015). Ceramic fabrication using mask-image-projection-based stereolithography integrated with tape-casting. *Journal of Manufacturing Processes*, 20, 456-464.
Song, X., Chen, Z., Lei, L., Shung, K., Zhou, Q., & Chen, Y. (2017). Piezoelectric Component Fabrication Using Projection-Based Stereolithography Of Barium Titanate Ceramic Suspensions. *Rapid Prototyping Journal*.
Wang, J.-C., Ruilova, M., & Lin, Y.-H. (2017). *The Development Of An Active Separation Method For Bottom-Up Stereolithography System*. Paper presented at the 2017 IEEE/SICE International Symposium on System Integration (SII), 108-114.
Wu, X., Lian, Q., Li, D., & Jin, Z. (2017). Tilting Separation Analysis Of Bottom-Up Mask Projection Stereolithography Based On Cohesive Zone Model. *Journal of Materials Processing Technology*, 243, 184-196.
Xiao, C., Tan, Y., Yang, X., Xu, T., Wang, L., & Qi, Z. (2018). Mechanical properties and strengthening mechanism of epoxy resin reinforced with nano-SiO2 particles and multi-walled carbon nanotubes. *Chemical Physics Letters*, 695, 34-43.
Yang, Y., Li, L., &Zhao, J. (2019). Mechanical property modeling of photosensitive liquid resin in stereolithography additive manufacturing: Bridging degree of cure with tensile strength and hardness. *Materials & Design*, 162, 418-428.
Zhou, C., Chen, Y., Yang, Z., & Khoshnevis, B. (2011). *Development Of Multi-Material Mask-Image-Projection-Based*

(56) References Cited

OTHER PUBLICATIONS

*Stereolithography For The Fabrication Of Digital Materials.* Paper presented at the Annual solid freeform fabrication symposium, Austin, TX. 65-80.
Zhou, C., Chen, Y., Yang, Z., & Khoshnevis, B. (2013). Digital material fabrication using mask image projection based stereolithography. *Rapid Prototyping Journal.*
Zhou, M., Tian, Y., Pesika, N., Zeng, H., Wan, J., Meng, Y., & Wen, S. (2011). The Extended Peel Zone Model: Effect Of Peeling Velocity. *The Journal of Adhesion*, 87(11), 1045-1058.

\* cited by examiner

Printing Process with Film Tensioning Mechanism

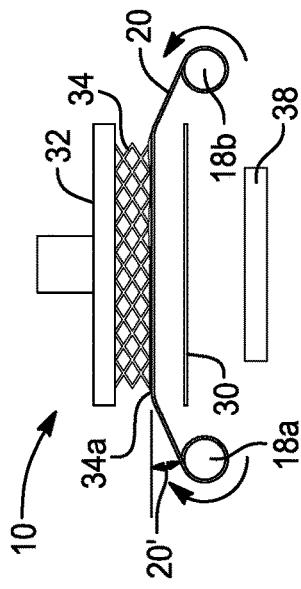

1. Thin layer of resin is cured in between printed structure and release film

FIGURE 4

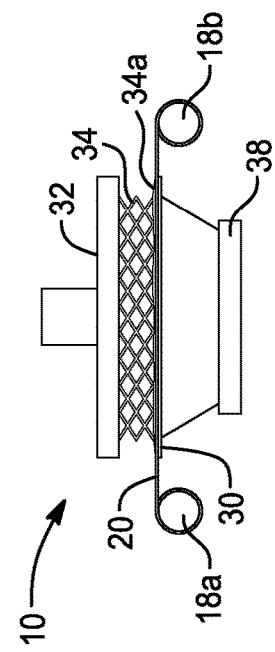

2. As build plate rises, release film is de-tensioned to create desired peel angle

FIGURE 5

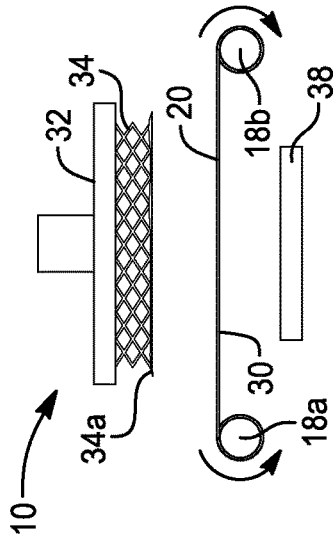

3. At desired peel angle, rollers re-tension film so separation initiates but can unwind additional film to preserve peel angle

FIGURE 6

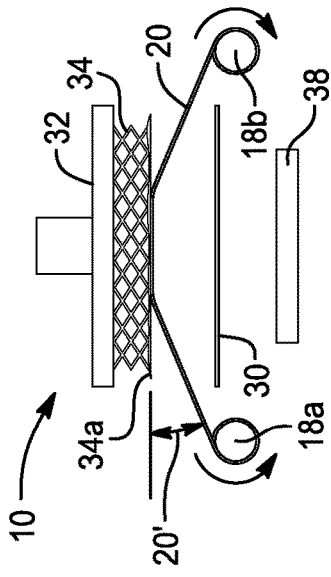

4. After separation propagates through whole part, film is fully re-tensioned in preparation for next layer

FIGURE 7

Pull Rate Testing Results

- Separation force at 45° is 3-7 times larger than 90°
- Separation force at 90° is less affected by pull rate
- Pull rate affected separation force more significantly at lower peel angles

SYSTEM AND METHOD FOR ROLL-TO-ROLL FILM TENSIONING FOR REDUCED SEPARATION FORCE DURING BOTTOM-UP STEREOLITHOGRAPHY

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to systems and methods for making 3D parts using stereolithography, and more particularly to a system and method for aiding in releasing a newly cured polymerized layer from a vat floor without damage to the newly cured layer, and where the system and method is especially useful with high viscosity resin used to form large-scale layers of a 3D part in a stereolithography system.

BACKGROUND

The statements in this section merely provide background information related to the present disclosure and may not constitute prior art.

Traditional stereolithography uses a galvo-mirror to scan a UV light source (e.g., UV laser) across the surface of a vat of resin, curing any photopolymer that receives a high enough exposure of the UV light beam to initiate polymerization. These devices typically place the UV light source above the vat with the laser scanning down onto the surface of the resin, polymerizing a thin layer of uncured resin between the liquid's surface down to the previously cured layer. This technique is suitable for resins with low enough viscosities that they can be spread smoothly and self-level due to gravity in order to achieve thin layers of 50-100 microns. However, high-viscosity resins, such as elastomers with large molecular weights or nanoparticle-reinforced polymers, are not able to be recoated in this fashion and must either be constrained with a membrane above or be printed in an inverted fashion in which the light source shines from below a transparent resin vat. Inverted, or bottom-up, stereolithography can be used to print with higher viscosity materials, and structures printed this way are pulled out of the resin bath as they are cured layer-by-layer. One drawback of this technique is that after illumination, the now-cured layer of resin will often adhere to both the previously cured layer above it as well as the vat floor below. This cured layer must be separated from the vat floor before fresh resin can be recoated under the part in preparation for the subsequent layer.

For resins that rely on free-radical polymerization that is oxygen-inhibited, this problem can be alleviated through the use of an oxygen-permeable membrane as the vat floor. Oxygen will diffuse through the membrane to create a thin "dead layer", in which resin cannot cure due to the presence of oxygen. With this solution, there is no peeling that needs to happen when lifting the part off the vat floor as the most recently cured layer will not be adhered to it. However, for a photopolymer whose crosslinking mechanism is not oxygen-inhibited, the resin will be polymerized all the way to the vat floor regardless of the presence of oxygen. For these materials, the part must undergo a separation process after each layer is cured. The extent to which this process can damage the part depends heavily on the material properties of both the cured and uncured resin, as well as a number of other factors such as the pull rate, part geometry, and material properties of the vat floor including its stiffness and surface energy. If not carefully controlled, the separation force between the cured resin and the vat floor can potentially damage small printed features or even tear the whole structure off the build substrate.

Two methods for reducing separation force during peeling include using a flexible base that deforms during separation or using a rigid base that can tilt. In the former method, the floor of the resin bath can be made of PDMS or a thin film, such as TEFLON® AF 2400, TEFLON® FEP, or Polymethylpentene (PMP) also marketed at TPX™ film. In any event, the thin film or PDMS needs to have a rigid support below it or be sufficiently tensioned so that it resists downwards deformation when the part descends prior to illumination, although this will limit its ability to deform upwards during separation. The film's deformation allows the edges of the part to be peeled off at an angle greater than zero degrees and reduces the force it takes to initiate peeling. The latter technique initiates the peeling process along a single edge, as opposed to the entire area. After illumination, the resin vat tilts downwards until the far edge of the printed layer begins to separate from the vat floor. While the vat continues to tilt, the line along which peeling occurs will propagate through the part and the peel angle will steadily increase. Both of these techniques successfully reduce the separation force a part will experience, but only to a certain degree as they are both limited to creating relatively small peel angles which can be appropriate for rigid printed parts but might not sufficiently reduce the separation force for printed elastomers or large structures.

Accordingly, a need still exists in the art for a photo stereolithography system which enables large scale, newly cured layers of a resin to be peeled from a resin supporting surface without damaging the newly formed layer.

SUMMARY

This section provides a general summary of the disclosure, and is not a comprehensive disclosure of its full scope or all of its features.

In one aspect the present disclosure relates to a tensioning system for use in a stereolithography manufacturing application. The system may include a build plate for supporting a three dimensional part being formed using a photo responsive resin, a base plate, a release element and a pair of tensioning components. The release element extends over the base plate and is configured to receive a quantity of photo responsive resin for forming a new material layer of the three-dimensional part. The pair of tensioning components are secured to opposite ends of the release element and apply a controlled tension force to the release element. A peel angle of the release element and a tension applied to the release element by the tensioning components are controlled to reduce a separation force required to separate the release element from the new material layer after the new material layer is cured.

In another aspect the present disclosure relates to a tensioning system for use in a stereolithography manufacturing application. The system may include a build plate for supporting a three dimensional part being formed using a photo responsive resin. The system may also include a base plate and a low surface energy release film. The low surface energy release film may extend over the base plate and is configured to receive a quantity of photo responsive resin for forming a new material layer of the three dimensional part. The system also may include a pair of tensioning rollers to which opposite ends of the release element are secured for applying a controlled tension force to the release element. A pair of motors may be included for controlling rotational movement of the pair of tensioning rollers. An electronic controller may be included for controlling the motors to vary a tension force applied by the tensioning rollers during fabrication of a new material layer and release of the new material layer from the low surface energy release film. A peel angle of the low surface energy release film and a tension applied to the low surface energy release film by the tensioning rollers is controlled by the electronic controller to reduce a separation force required to separate the release element from the new material layer when the new material layer is cured and being removed from the low surface energy release layer.

In still another aspect the present disclosure relates to a method of controlling tensioning of a release element being used to support a photo responsive resin in a stereolithography manufacturing application. The method may include arranging a release element over a base plate, where the release element supports a three dimensional part being formed using a quantity of photo responsive resin. The method may further include controlling a pair of tensioning components operatively coupled to the release element to control a tension experienced by the release element as the release element is peeled from a newly formed material layer after a quantity of photo responsive resin being used to form the newly formed material layer has cured. The method may further include controlling the amount of release element that has been unwound such that a peel angle of the release film is maintained at least substantially constant while the release element is peeled from the newly formed material layer.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIGS. 4-7 are simplified side views of the system of FIG. 1 at different stages of forming a new material layer of a 3D part, showing in greater detail the operations that occur when the system effects release of the release film by controlling the tension applied to the release film by the control rollers;

DETAILED DESCRIPTION

Example embodiments will now be described more fully with reference to the accompanying drawings.

Figure 1:
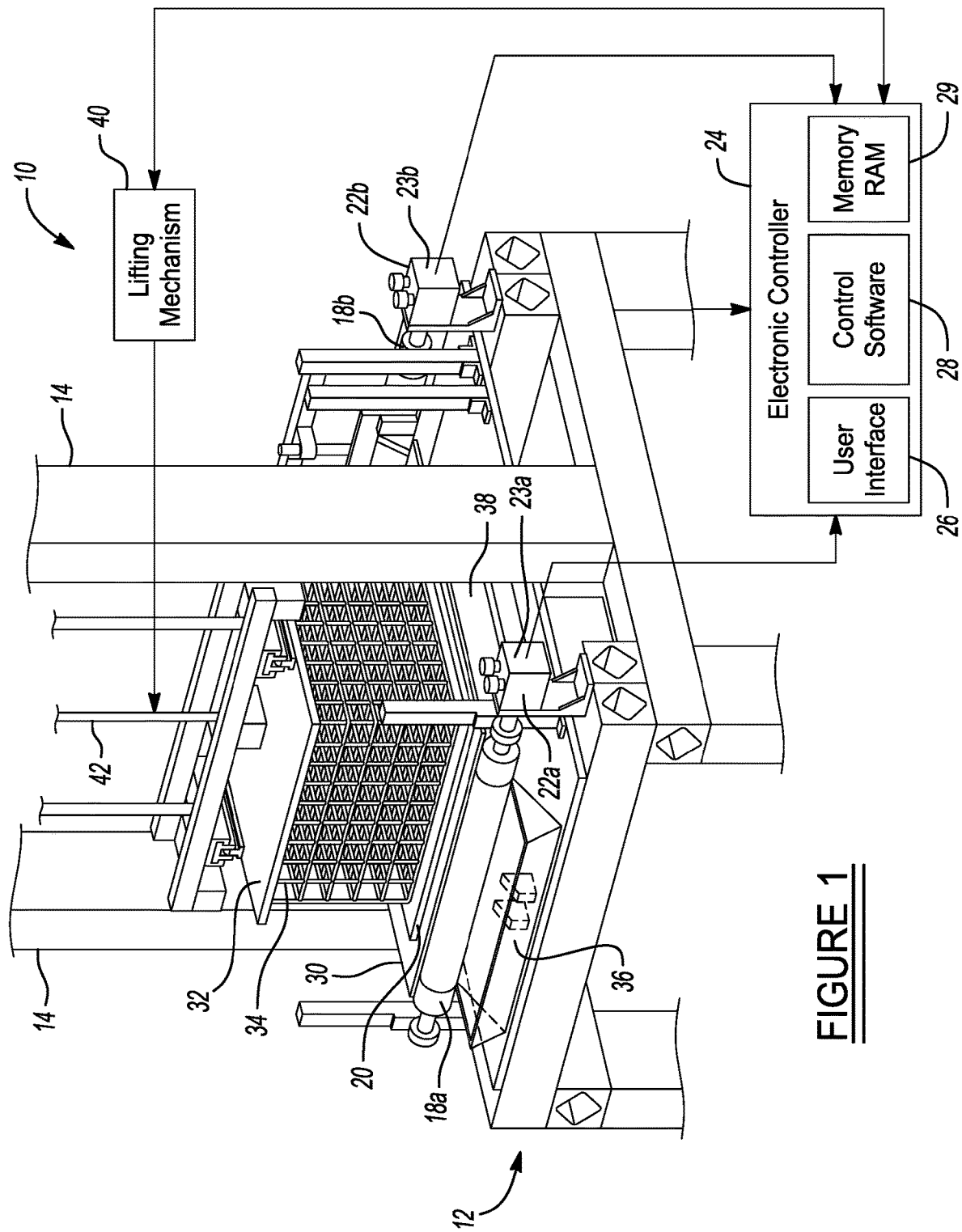
FIG. 1 is a block diagram of one embodiment of a tensioning system for use in a photo stereolithography system in accordance with the present disclosure.

Referring to FIG. 1, one embodiment of a variable tensioning system 10 is shown in accordance with the present disclosure. In this example the variable tensioning system 10 (hereinafter simply the "system 10") includes a frame structure 12 having upright frame elements 14 which each support a pair of tensioning components 18*a* and 18*b*. The tensioning components 18*a* and 18*b* are secured to opposite ends of a low surface energy release film 20. In one form the tensioning components 18*a* and 18*b* comprise rollers, although it will be appreciated that any mechanical structure that can be controlled to controllably increase and decrease the tension experienced by the low surface energy release film 20 may be used. For convenience, the tensioning components 18*a* and 18*b* will be referred to throughout the following discussion as "tensioning rollers" 18*a* and 18*b*.

In this example the low surface energy release film 20 is wound on the tensioning rollers 18*a* and 18*b*. By "wound on" it is meant that opposing ends of the low surface energy release film are secured to, and portions thereon wound onto, the tensioning rollers 18*a* and 18*b* such that controlled clockwise and counterclockwise rotational movements of the tensioning rollers causes a controlled increase or decrease in the tension experienced by the low surface energy release film 20. In one example the low surface energy release film 20 may be formed from fluorinated ethylene propylene (known as TEFLON FEP® Film). In another example the low surface energy release film 20 may be TEFLON™ AF 2400. However, the system 10 is not limited to use with only these types of release films, and virtually any other low surface energy release element, sheet or film may potentially be used with the system 10. For convenience, the low surface energy release film 20 will be referred to throughout the following discussion simply as the "release film 20".

The tensioning rollers 18*a* and 18*b* each include an electric motor 22*a* and 22*b*, respectively. In this example the electric motors 22*a* and 22*b* may be DC stepper motors, but any other suitable form of motor may be used. The electric motors 22*a* and 22*b* are in communication with an electronic controller 24. The electronic controller 24 may include a user interface 26, control software 28 and memory 29. The user interface 26 may include a keyboard, a touch sensitive LCD panel or other input device for allowing the user to input user selected variables (e.g., desired peel angle) that help, in connection with the control software 28, to control the tensioning and release of the release film 20 by the electric motors 22a,22b during formation of a material layer, as will be described in greater detail in the following paragraphs. The control software 28 may include the algorithms needed to determine a peel angle based on a number of variables including the part geometry, peel rate, type of release film being used, as well as other factors that influence the required force to peel the release film 20 from a newly formed material layer.

The system 10 may also include a base plate 30 disposed under the release film, and a build plate 32 on which a part may be constructed. In one form the base plate may be made from acrylic or any other suitable, optically transparent material. The base plate 30 acts as a support for the release film 20 and a new material layer that is being formed on the release film 20. FIG. 1 shows a portion of a part 34 under construction. A residual resin collector bin 36 may be included to capture excess resin as a new resin layer is deposited on the release film 20. An ultraviolet (UV) light source 38 may be configured below the base plate 30, and in this example is in communication with the electronic controller 24 and controlled by the electronic controller. The UV light source 38 is used to apply UV light from underneath the base plate 30, through the release film 20, to cure a layer of photo-responsive polymer resin on the release film 20. Optionally, a separate controller may be used to control the UV light source 38.

The system 10 may also include a suitable lifting mechanism 40 which is coupled to the build plate 32 and used to lift the build plate 32 and the 3D part formed thereon, via rod, a cable 42 or any other form of mechanical link. The lifting mechanism 40 lifts the build plate 32 and the 3D part 34 being formed thereon incrementally a sufficiently large distance to peel the release film 20 from the most recently formed material layer to allow a new material layer to be formed on the release film 20, and it then lowers the build plate 32 and the 3D part 34 until they are a small vertical distance (e.g., 10 µm-100 µm) higher than they were on the previous layer, as each layer of the 3D part is formed. The lifting mechanism 40 may be in communication with the electronic controller 24 and controlled by the electronic controller as shown in FIG. 1, or a different, stand-alone controller may be used to control lifting of the build plate 32. A conventional resin application nozzle/system (not shown) is used to apply a new quantity of resin to the release film 20 for forming a new material layer of the 3D part 34.

Figure 2:
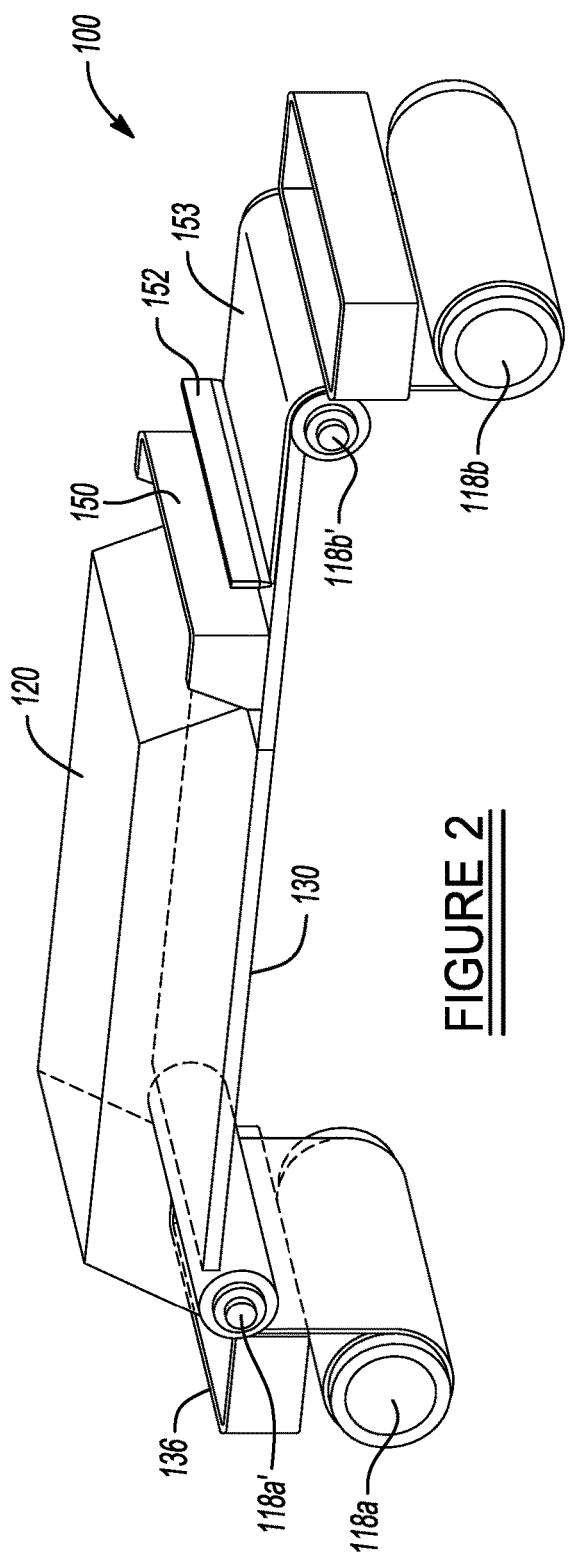
FIG. 2 is a simplified perspective view of another embodiment of the tensioning system of the present disclosure which incorporates idler rollers for an additional level of functionality and peel control.
Figure 3:
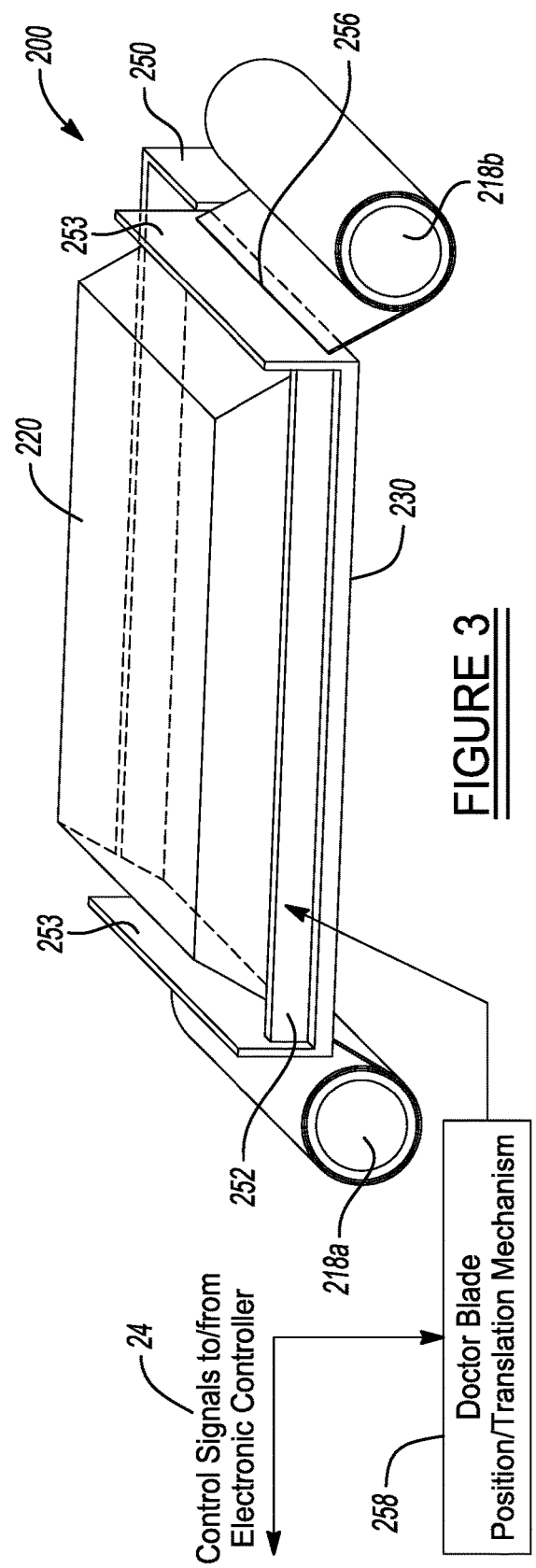
FIG. 3 is a simplified perspective view of still another embodiment of the tensioning system of the present disclosure which incorporates a perpendicularly arranged doctor blade and residual collector tray.

Referring to FIGS. 2 and 3 show different embodiments of the present invention. A system 100 shown in FIG. 2 is similar to the system 10 of FIG. 1, and common components have been identified by reference numbers increased by 100. To avoid cluttering the figure, various components such as the electric motors 22a and 22b, the electronic controller 24, the lifting mechanism 40 and certain other components used for controlling operation of the system 100 have not been shown in FIG. 2, although typically these components would be used as well with the system 100. The system 100 differs from the system 10 principally in that it incorporates a pair of idler rollers 118a' and 118b'. The idler rollers 118a' and 118b' can be used to help change the peel angle of the release film 120 when peeling the release film from a newly cured material layer of resin, which can be helpful in maintaining a consistent peel angle while peeling the release film from large scale surface areas of a newly formed material layer of resin. The idler rollers 118a' and 118b' can also be mounted in-line with a device to measure force such as a strain gauge force transducer in order to calculate the tension being applied by release film 120. The system 100 in this example also includes a low viscosity resin scooper tray 150 for capturing excess resin during a release operation, and a conventional doctor blade 152 for helping to spread the new resin layer into a thin layer of uniform thickness while the release film 120 is being unwound from control roller 118b and taken up on control roller 118a, preparatory to forming a new material layer, as will be described further in the following paragraphs. Since the release film 120 will be wound and unwound along the axis where the doctor blade 152 is positioned (i.e., in the plane of motion of the release film 120), there is no need to translate the doctor blade. The doctor blade 152 can be maintained at a predetermined height above the release film, which enables it to spread a new resin material layer of consistent thickness every time the release film 120 is re-coated with resin. In FIG. 2, the resin may be deposited at area 153, and the doctor blade 152 will spread the newly deposited resin evenly as the release film 120 is taken up onto roller 118a.

FIG. 3 shows a system 200 in accordance with another embodiment of the present disclosure. The system 200 is similar to the system 100 and components in common with those of the system 100 have been designated with numbers increased by 100. The system 200 differs principally from the system 100 in that no idler rollers are used, and both a resin scooper structure 250 and the doctor blade 252 are each oriented perpendicular to the direction of movement of the release film 220 rather than parallel to the direction of movement (i.e., the spreading occurs in the axis orthogonal to movement of the release film 220, whereas the spreading by the system 100 occurs in the same axis as the release film 120 is moving). Flexible (e.g., rubber or polymer) linear gasket elements 253 are fixedly positioned at each end of the base plate 230 and are positioned so that a downwardly facing edge of each gasket element is in contact with the base plate 230. The flexible linear gasket elements 253 can deform sufficiently for the release film 220 to slide through, but capture low viscosity resin that could otherwise drain onto the spooled up release film 220 on the control rollers 218a and 218b. In this embodiment the doctor blade 252 will need to move laterally back and forth across the release film 220 (perpendicular to the direction of motion of the release film 220) to remove excess resin after each curing operation takes place, with the excess resin being collected in the resin scooper structure 250. In the same lateral translation across the release film 220, the doctor blade 252 will form a new material layer on the release film 220 by spreading material that had been previously deposited by a conventional resin application nozzle across the length of the doctor blade 252. As such, it will be appreciated that the back and forth motion of the doctor blade 252 in this embodiment requires a suitable positioning/translation mechanism 258 for moving the doctor blade 252 at the appropriate times (i.e., after a new layer of resin has been applied to the release film 252). The positioning/translation mechanism 258 may be an independently controlled subsystem or it may be controlled by the electronic controller 24, as shown in FIG. 3.

Referring now to FIGS. 4-7, operation of the system 10 will be described. Initially the release film 20 is tensioned over the base plate 30. This enables the base plate 30 and the release film 20 to effectively form a rigid substrate which acts as a transparent vat "floor". The release film 20 is wound onto the two control rollers 18a and 18b by the electric motors 22a and 22b, respectively. The control of the electric motors 22a and 22b regulates the tension of the release film 20. If the optional idler rollers 118a' and 118b' are included they can serve to change the peel angle of the release film 20 depending on where they are placed with respect to the printed part. Optionally, they can also measure the tension in the film if they are mounted in line with a conventional strain gauge or load cell. This is because the optional idler rollers 118a' and 118b' will be placed in between the 3D part 34 and their respective control roller 18a or 18b, and they will thus experience a force acting upon them by the tensioned release film 20 towards their axial centers where they are mounted for rotation. Still further, the electric motors 22a and 22b could themselves include both torque sensing or current sensing circuitry, and both torque sensing circuitry and current sensing circuitry can be used for gauging the tension of the release film 20 during various stages of operation of the system 10. In FIG. 1, torque or current sensing components 23a and 23b associated with the electric motors 22a and 22b, respectively are shown for sensing the tension being experienced by the release film 20 in real time during a peel operation.

In FIG. 4 a thin layer of UV sensitive resin 34a is cured in between the portion of the 3D part 34 that has already been constructed and the release film 20. In FIG. 5, as the build plate 32 is lifted away from the release film 20, the release film is simultaneously de-tensioned by suitable control signals applied to the electric motors 22a and 22b by the electronic controller 24, which controls motion of the control rollers 18a and 18b. In one implementation both control rollers 18a and 18b are controlled by their respective electric motors 22a and 22b to rotate in opposite directions so that equal amounts of the release film 20 are unspooled from the control rollers and tension of the release film is thus released. In the case that the 3D part 34 is not aligned in the center of the base plate 30, so that the two lengths between either edge of the 3D part 34 and their respective control roller 18a and 18b are not equal, electric motors 22a and 22b will still rotate in opposite directions but must rotate by unequal amounts to maintain an equal film tension on both sides.

In FIG. 5, as the release process continues with the continued lifting of the build plate 30, a predetermined "release angle" will be reached. This predetermined release angle is indicated in FIG. 5 as angle 20'. As indicated in FIG. 6, once the predetermined release angle 20' is reached during lifting of the build plate 30, the control rollers 18a and 18b are controlled by their respective electric motors 22a and 22b to retension the release film 20. As the build plate 30 is lifted further, the electric motors 22a and 22b control rotational movement of the control rollers 18a and 18b to allow a needed amount of the release film 20 to be unspooled from the control rollers so that the predetermined release angle 20' is maintained during the entire release operation (i.e., while the build plate 30 continues to be lifted). Thus, as the release film 20 releases from the newly cured resin layer 34a, portions of the release film 20 still in contact with the newly cured resin layer 34a will move toward the center of the build plate 30, as indicated in FIG. 6, but the predetermined release angle will be maintained constant. This is to ensure a constant peeling force will be applied regardless of how large the 2D area of the build plate 30 is.

Referring to FIG. 7, after the build plate 30 has been lifted a sufficient vertical distance to fully separate the release film 20 from the newly formed resin layer 34a, which now forms an integral portion of the 3D part 34, the release film 20 will be retensioned by rotation of the control rollers to take up the slack in the release film 20. To accomplish this, the control rollers 18a and 18b will be rotated in opposite directions (i.e., control roller 18a counterclockwise and control roller 18b clockwise) in FIG. 7, until the release film 20 is taut against the base plate 30. Any uncured resin can then be removed, and a new quantity of resin can then be applied to the upper surface of the release film 20 in preparation for forming a new material layer of the 3D part 34.

Figures 8, 9:
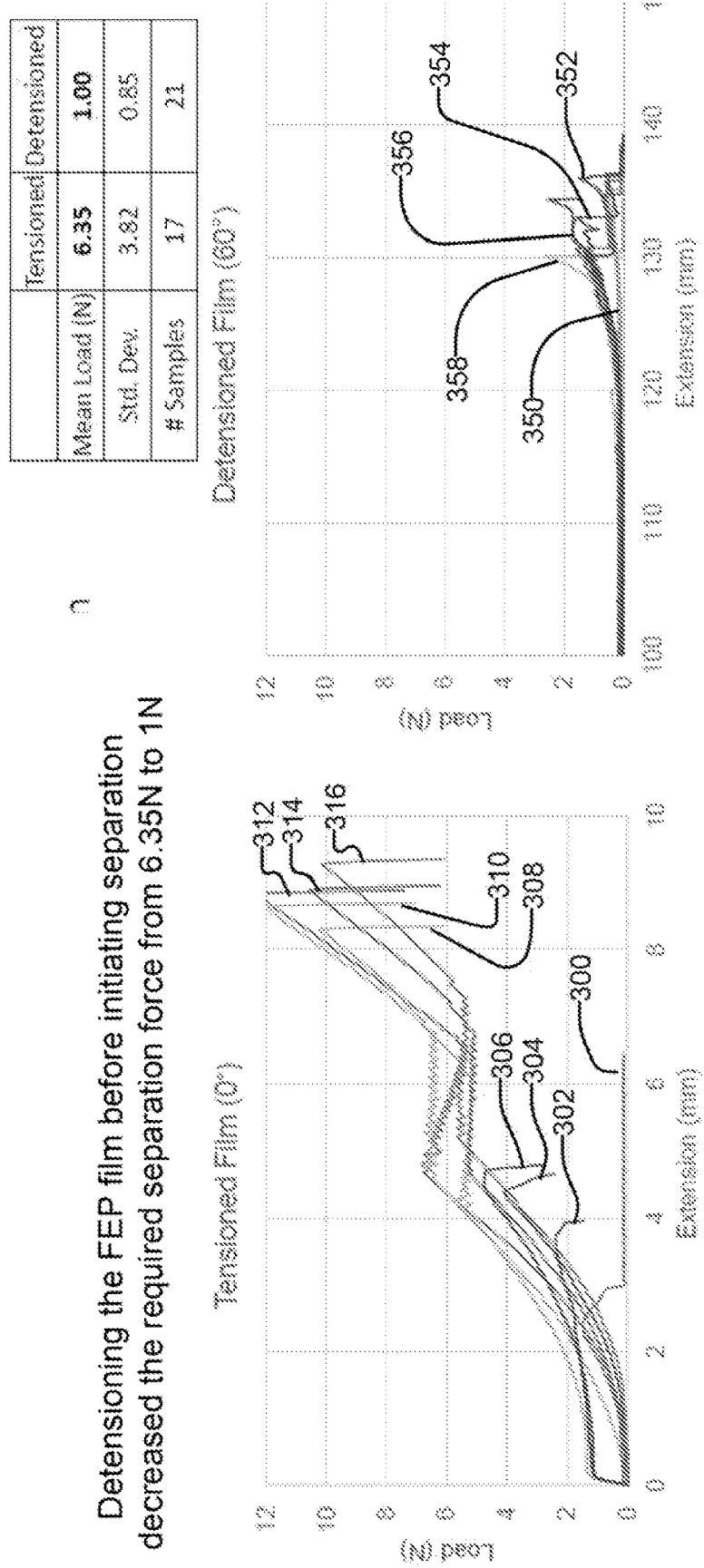
FIGS. 8 and 9 show test results illustrating how de-tensioning the release film before initiating separation from a newly cured layer reduced the required separation force from 6.35N to 1N.

The co-inventors of the present disclosure have conducted a series of experiments to verify that a required separation force to peel a newly formed layer from the release film 20 will be reduced significantly with increased peel angles. Curves 300-316 of FIG. 8 and curves 350-358 of FIG. 9 show the results of a number of tests conducted to determine the release force required to release the TEFLON FEP® release film from the newly cured resin layer for two different peel angles. The test results of FIG. 8 show the peel tests performed at a constant 0° peel angle, indicating that the peel force required to achieve release of the release film can vary considerably and is not repeatable. FIG. 9 shows data from test samples that were prepared in the same manner as those in FIG. 8 but peeled at an angle of 60°. A significant reduction in the force required to achieve peeling of the release film from 6.35N to about 1N was achieved by de-tensioning the release film prior to separation. While 17 samples were taken with the tensioned film, only 9 have been plotted in FIG. 8. Twenty-one samples were taken with the release film de-tensioned and ten have been plotted in FIG. 9, although only 5 are clearly visible in FIG. 9. The plotted curves for both FIGS. 8 and 9 are indicative of the entire set of tests conducted for each peel angle.

Figure 10:
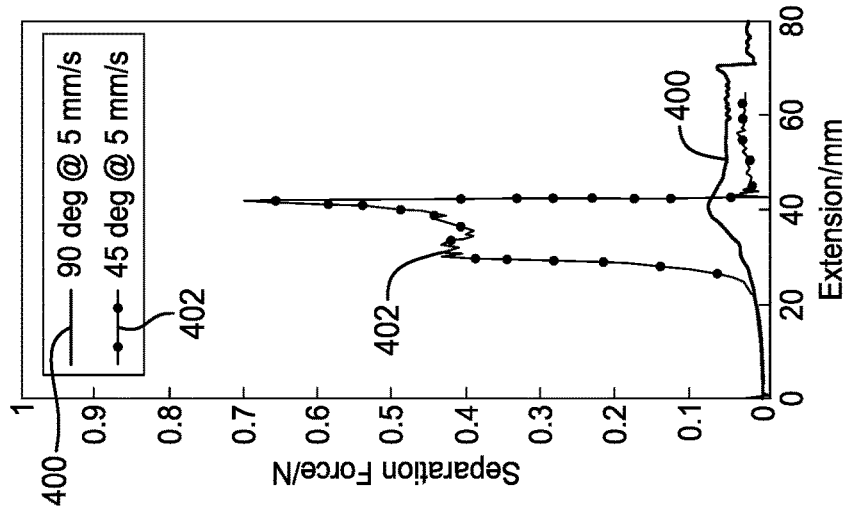
FIGS. 10-12 show the results of separation pull tests performed at 45° and 90° angles at different pull rates, and how the separation force at 90° is less affected by the pull rate.
Figure 11:
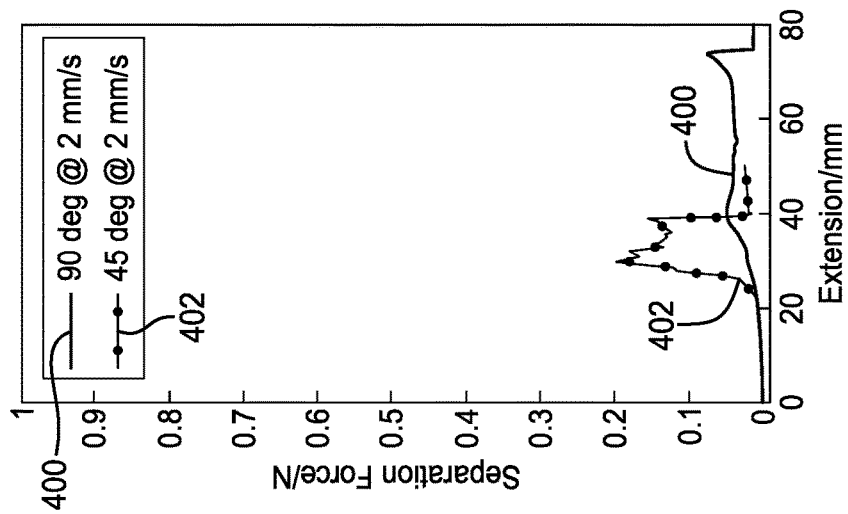
Figure 12:
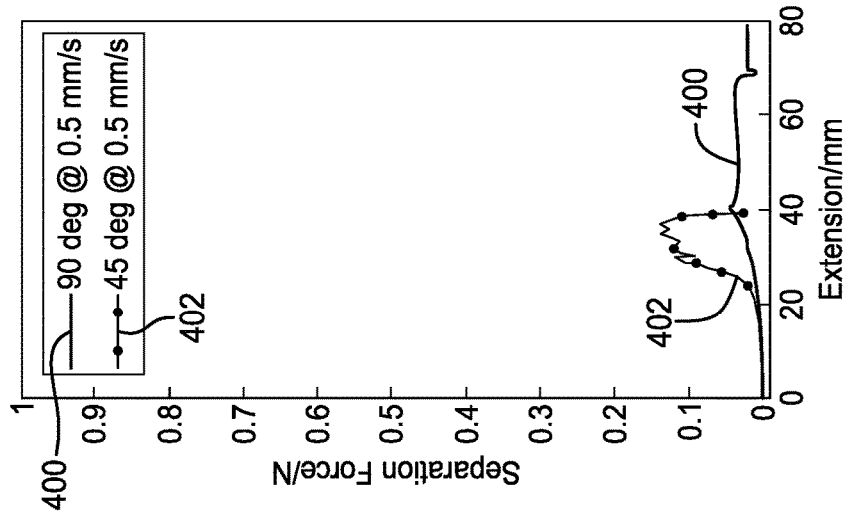

The second set of tests, shown in FIGS. 10-12 examined how the separation force is dependent on pull rate for 45° and 90° peel angles, as indicated by curves 402 and 400, respectively. These tests were conducted by curing a rectangular volume of resin between a pull tab and the release film and pulling the film at rates of 0.5 mm/sec, 2 mm/sec and 5 mm/sec. Results indicated a reduction in separation force when increasing the peel angle from 45 to 90° that varied from approximately three to seven times as small, with quicker pull rates resulting in a greater reduction in the separation force with increasing peel angle.

Analytical Predictions of Separation Force

To predict the separation force during the peeling process, an energy-based mathematical model is described in this section to predict the separation force at low peel rates. Then, the viscoelastic behavior of the PDMS resin is considered to predict the separation force at higher peel rates.

The required separation force is related to several geometric and material parameters, including the surface energy of the bonded interface, peel angle, peel rate, the geometric shape of the part being formed, as well as Young's modulus of the material. Kendall (K Kendall, 1971; Kevin Kendall, 1975) modeled the separation of an adhesive joint by considering the total energy change in the system. The model assumes that no energy is lost to viscous dissipation or other forms of energy dissipation. Accordingly, the model is suitable only for low peel rates.

Figure 13:
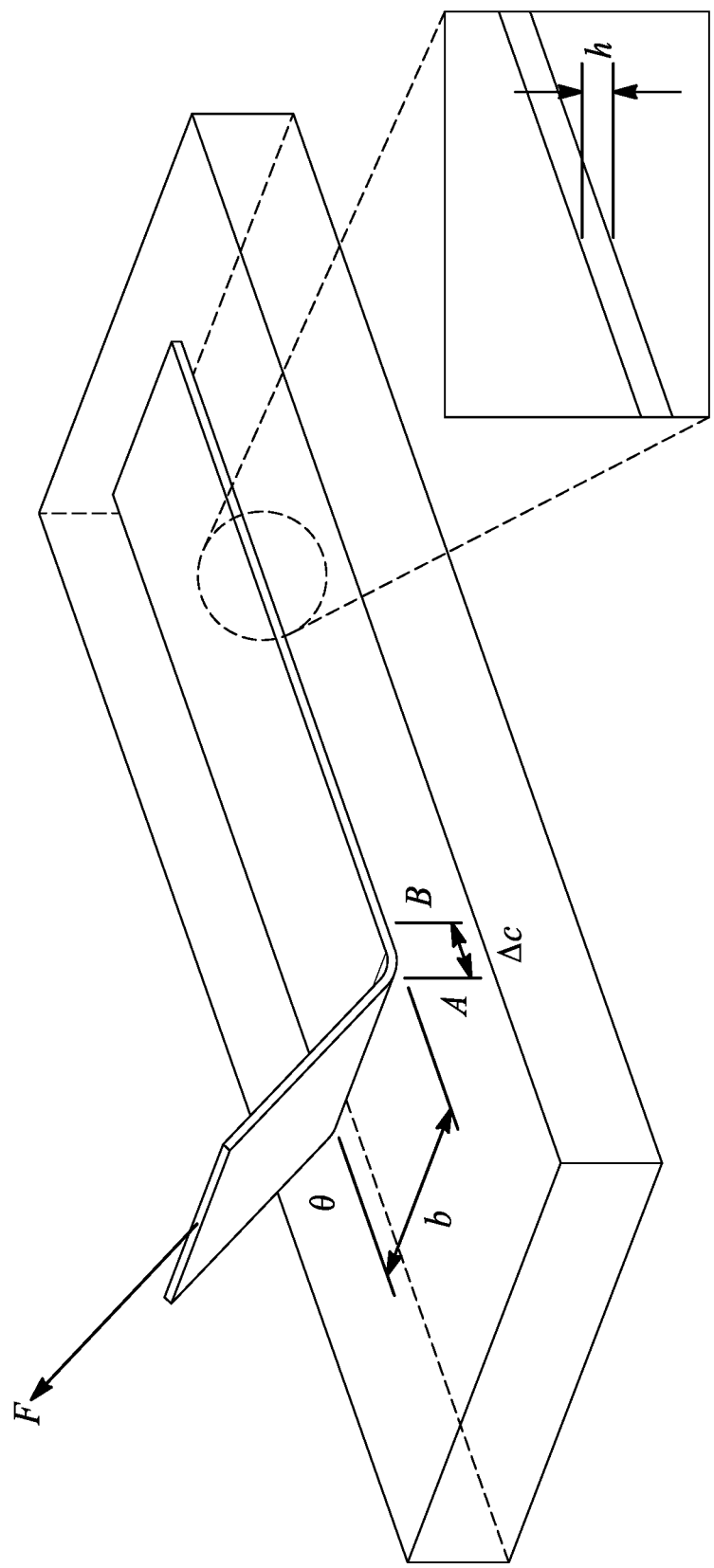
FIG. 13 shows a simplified 3D illustration of a release film being released from a substrate to help explain how the required separation force for a given release film can be predicted.

Consider the energy changes involved as a cohesive zone of length, $\Delta c$, and width, b, peels between points A and B in FIG. 13 at an angle, $\theta$, between the film and the substrate.

Three elements contributions to the work required to separate the film from the substrate:

a surface energy term, $-\Gamma b \Delta c$, due to the creation of new surfaces;

a potential energy term, $F(1-\cos\theta)\Delta c$, due to the movement of the peel force; and an elastic term due to extension of the PDMS in the direction of the applied force $-F^2\Delta c/2bhE$.

where F is the driving force of the peeling process, b is the width of the adhesion area, h is the thickness of the film, $\Delta c$ is the length of the cohesive zone, $\theta$ is the peel angle, and E is the Young's modulus of the film material. Separation occurs when the potential and elastic energy terms equal the mode-dependent surface energy term as follows:

$$F(1-\cos\theta)\Delta c - \frac{F^2\Delta c}{2bhE} = \Gamma b\Delta c \qquad (1)$$

F/b, which is the separation force (per unit width) required to cause delamination can be represented by rearranging Equation (1) as follows:

$$\frac{F}{b} = Eh\left[\sqrt{(1-\cos\theta)^2 - \frac{2\Gamma}{Eh}} + (1-\cos\theta)\right] \qquad (2)$$

If the separation force is very small, the elastic energy stored in the system is insignificant when compared with the other components of Equation (1) and may be neglected. Accordingly, the second term of equation (1), which corresponds to elastic energy, vanishes yielding a simplified expression:

$$F(1-\cos\theta)\Delta c = \Gamma b\Delta c \qquad (3)$$

The separation force per unit width can be derived as:

$$\frac{F}{b} = \frac{\Gamma}{(1-\cos\theta)} \qquad (4)$$

To neglect the elastic term, the separation force F and Young's modulus of the film or substrate must obey the following relationship (Kovalchick, 2011):

$$\frac{F}{bh} \ll \frac{E_{substrate}}{film} \qquad (5)$$

If the condition in Equation (5) is met and the peel rate is slow, Equation (4) predicts the separation force when the geometry of the peeling specimen and the surface energy term, $\Gamma$, are known. Research on the surface energy between Teflon film and PDMS resin is limited, but an estimate can be acquired via experimentation. Specifically, Equation (4) can be rearranged to represent the surface energy term as follows:

$$\Gamma = \frac{F(1-\cos\theta)}{b} \qquad (6)$$

Equation (6) can be used to estimate the surface energy between Teflon film and PDMS resin as a function of the peel angle, the width of the adhesion zone, and the separation force, all of which can be determined by experimentation. This model is suitable for all types of 2D geometries since the separation force is influenced only by the width of the adhesion area and the peel angle regardless of the 2D geometry of the polymerized part. According to (Kovalchick, 2011), the surface energy is a material property and is independent of peel angle and peel rate; therefore, once the surface energy is obtained by one set of experiments, it can be used to predict the separation force under any peel angle.

It is important to note, however, that this model does not take into account the viscoelastic behavior of the PDMS resin. Accordingly, it is suitable only for a quasi-static process with low peeling rates such that viscoelastic properties have little effect on the separation process. As stated by (Kovalchick, 2011; Peng, Wang, Chen, & Chen, 2014), the peel rate has a significant impact on the actual separation force. A higher peeling rate also means a faster overall printing speed, so it is important to know how different peel rates affect the separation force. Several authors (Du, Lindeman, & Yarusso, 2004; Peng et al., 2014; M. Zhou et al., 2011) have shown that the separation force can be predicted as a function of the peeling rate as follows:

$$\frac{F}{b} = C_0(1+kv^n) \qquad (7)$$

where v is the peel rate, b is the width of the adhesion zone, $C_0$ and k are functions of the peel angle and related to the thickness of the viscoelastic thin-film, and n is a constant related to the intrinsic property of the thin film and does not change for different peel angles. Values of $C_0$, k, and n can be obtained from experiments by plotting the separation force verses the peeling rate and using a curve fitting tool to estimate the value of each parameter.

Surface Energy

To utilize Equation (6) to estimate the surface energy between Teflon and PDMS from experimental results, the experiment must be conducted at the lowest possible peel rate to eliminate the effect of viscoelastic behavior. In this experiment, the peel rate is set to 0.1 mm/s, which is the lowest possible peel rate of the Instron 3345. The peel angle is set to 90°, and the peel tests in this section are repeated at least 3 times.

A typical curve of separation force vs peeling distance is exhibited in FIG. 13. The curve shows that there are 3 stages in a peeling process: (i) the separation force increases initially to a critical point where the initial crack opens and new surfaces are generated; (ii) once the interface starts propagating, a slight drop in the separation force can be observed; (iii) the peeling process enters a steady-state and the separation force remains approximately at a constant value. The steady-state separation force is defined as the separation force in this experiment.

Figure 14:
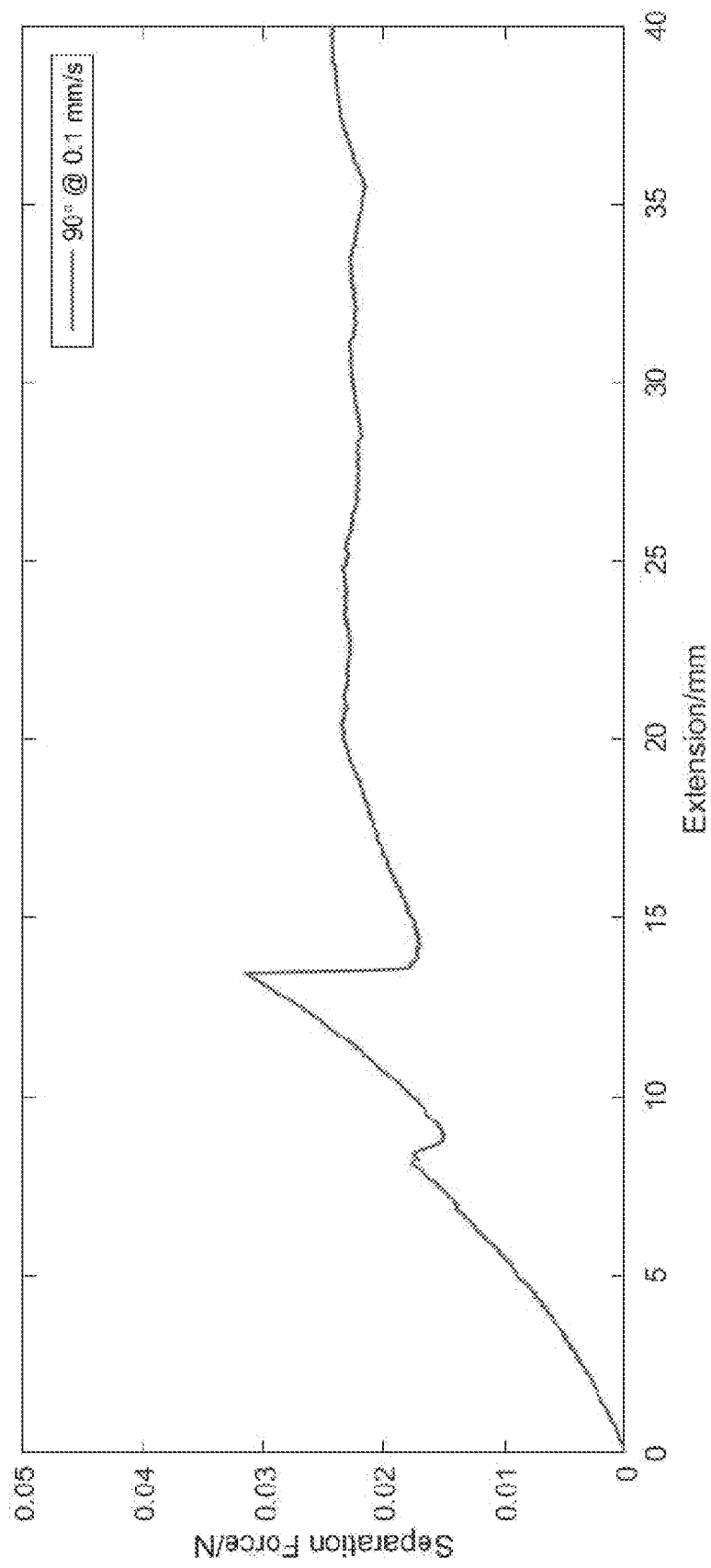
FIG. 14 shows a typical separation force curve resulting from a 90° peel angle and a peel rate of 0.1 mm/s.

According to FIG. 14, the average separation force at 90° is approximately 0.0239 N. According to Equation (5), the relationship between separation force F and Young's modulus of the film or substrate fulfills F/bh=1494 Pa$\ll E_{PDMS}$=2.5 GPa, where separation force F=0.0239 N, the peeling width b=0.04 m and the film thickness h=400 µm. As a result, the Teflon film and the PDMS substrate can be considered as rigid materials. Therefore, the surface energy can be calculated using equation (6) as follows:

$$\Gamma = \frac{F(1-\cos\theta)}{b} = 0.598 \frac{J}{m^2} \qquad (8)$$

where the peel angle, $\theta$, and the peeling width, b, are 90° and 0.04 m, respectively. Across all of the peel test results conducted at 90° and a peel rate of 0.1 mm/s, the $\Gamma$ ranges from 0.443 J/m$^2$ to 0.602 J/m$^2$, with an average of 0.538±0.078 J/m$^2$. This surface energy, $\Gamma$, is used along with the model of Equation (7) in upcoming sections to predict separation force under different peel angles and peel rates.

Figure 15:
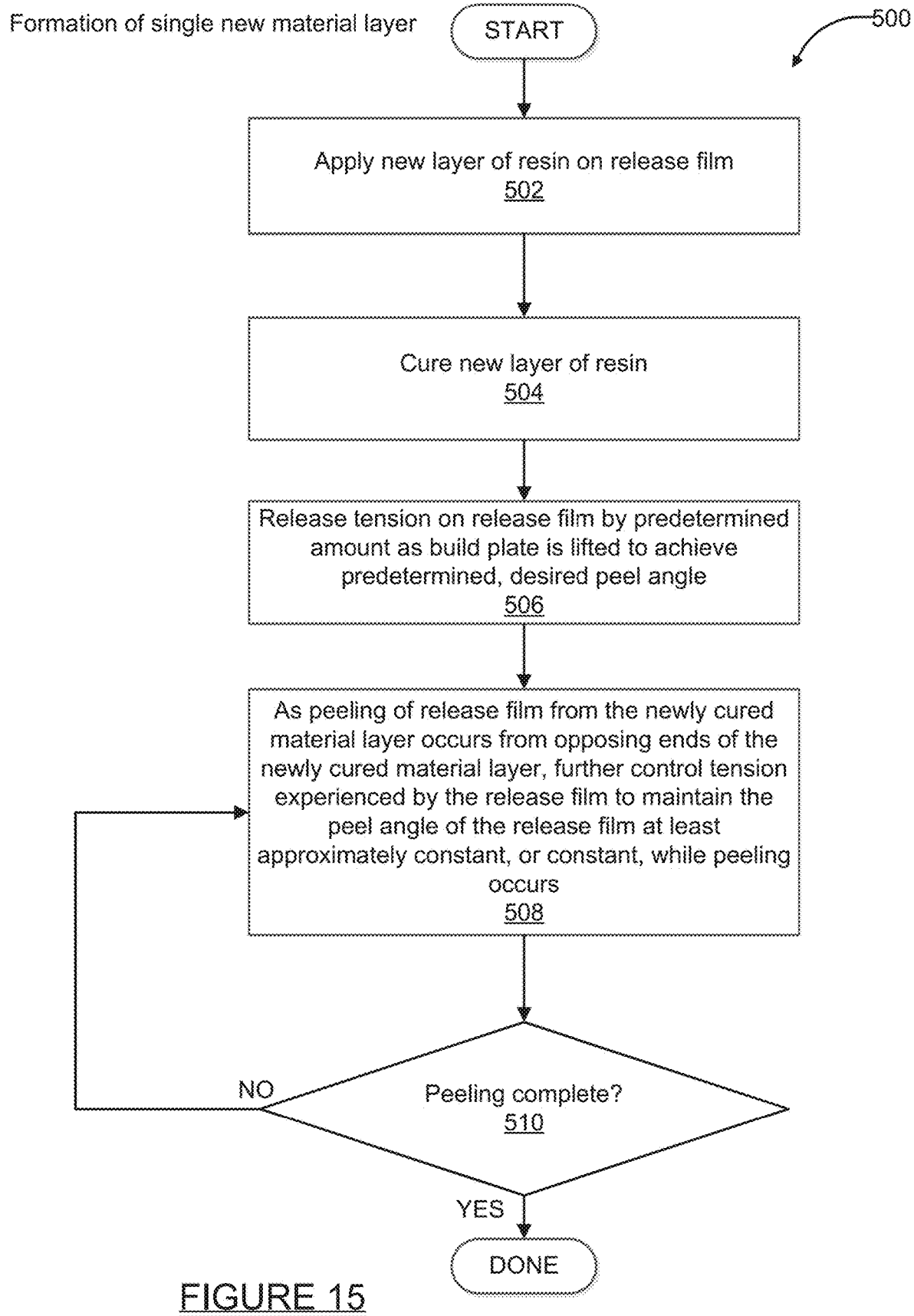
FIG. 15 is a flowchart showing one example of basic operations that may be performed using a method of the present disclosure to form and release one material layer from a release film on which the new material layer has been formed.

Referring briefly to FIG. 15, a flowchart 500 is shown which illustrates major operations carried out by the system 10 during an operation of forming a new material layer of a 3D part. At operation 502 a new layer of photo responsive resin is applied on an upper surface of the release film 20. At operation 504 the new layer of photo responsive resin is cured, for example using the UV light source 38 of FIG. 1. At operation 506, the electronic controller 24 controls the electric motors 22a and 22b such that the tensioning rollers 18a and 18b release the tension on the release film 20 by a predetermined amount as the build plate 32 is lifted away from the release film, to achieve the predetermined, desired peel angle (e.g., such as angle 20' in FIGS. 5 and 6). At operation 508, as peeling of the release film 20 continues to occur from opposing ends of the newly formed material layer, the tension applied by the tensioning rollers 18a and 18b is further controlled by the electric motors 22a,22b and suitable control signals from the electronic controller 24 to maintain the peel angle of the release film 20 approximately at the predetermined, desired peel angle, or more preferably perfectly constant at the predetermined, desired peel angle, as the build plate 32 and the partially formed 3D part continue to be lifted away from the base plate 30. A check is then made at operation 510 to determine if the peeling is complete, and if not, operation 508 continues. When the check at operation 510 indicates that peeling is complete (i.e., the release film 20 has been fully separated from the newly formed material layer), then formation of a new material may be undertaken (i.e., operations 502-510 repeated). It will be appreciated that the above operations assume that the user has entered the predetermined, desired peel angle into the electronic controller 24, for example via the user interface 26 shown in FIG. 1.

The various embodiments of the present disclosure can be used to decrease the separation force when removing a cured layer of resin from the vat floor in a bottom-up stereolithography system. It will be appreciated that a single structure manufactured using stereolithography can have thousands of layers, each needing to be peeled from the floor of the resin vat, which can be an oxygen-permeable membrane such as PDMS or a low surface energy release film such as FEP Teflon. The various embodiments of the present disclosure are able to de-tension the release film, simultaneously, from both sides of the build plate to initiate the peeling of the cured part from the film at a higher peel angle and, thus, with a lower force required for separation. In addition to lowering the force required for separation, incorporation of two additional rollers with strain gauges allows for real time monitoring of the tension in the release film. This additional functionality provides the ability to adjust the peel angle or pull rate, in real time if necessary, in order to keep the separation force below a predetermined threshold at which part failure would occur.

It will also be appreciated that the various embodiments of the present disclosure discussed herein will work whether configured as a "top-down" or "bottom-up" projection system. That is, whether the build plate is above or below the illumination source. The former would constitute an upside-down or "bottom-up" system that is described herein. The upside-down system would be suitable for pastes and parts that hold their shape under their own weight under gravity.

It will also be appreciated that the peel angle discussed herein could come from different, and possibly simultaneous, directions. The examples shown and discussed herein are unidirectional and along the tensioning roller direction. However the peel angle might be, for example, bidirectional, if the part geometry warrants it. In this example, there would be something pinning and holding the substrate in some fashion on the edges of the system.

It will also be appreciated that the substrate (i.e., build plate or vat floor material) could be quite flexible, stretchable, and compliant so long as it has the needed optical and surface energy properties. If the material was flexible, stretchable, and compliant, then potentially there may be a greater opportunity to increase the local stress at the build material/substrate interface and determine the point of initial peeling, which may lead to even better peel behavior. Also, the local stress could be increased by employing combinations of complex (e.g., possibly multidirectional and different magnitude) folding and stretching to enhance peeling. For example, one might want the peeling to initiate at a specific point in the part geometry (perhaps literally a point), because once peeling is initiated (i.e., it requires some activation energy), it is easier to continue peeling the rest of the part. A stretchable material could be tensioned (or not) during the build.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method of controlling tensioning of a release element being used to support a photo responsive resin in a stereolithography manufacturing application, the method including:
arranging a release element over a base plate, the release element for supporting a three dimensional part being formed using a quantity of photo responsive resin;
controlling a pair of tensioning components operatively coupled to the release element, where the tensioning components are disposed in fixed locations relative to the base plate, and on opposite lateral sides of the base plate, to control a tension experienced by the release element as the release element is peeled from a newly formed material layer after the quantity of photo responsive resin being used to form the newly formed material layer has cured; and
controlling a tension applied to the release element using the tensioning components such that a peel angle of the release element is maintained constant while the release element is peeled from the newly formed material layer.

2. A tensioning system for use in a stereolithography manufacturing application, the system including:
a controller;
a build plate for supporting a three dimensional part being formed using a photo responsive resin;
a base plate;
a release element extending over the base plate, the release element configured to receive a quantity of photo responsive resin for forming a new material layer of the three-dimensional part;
a pair of independently rotationally supported tensioning components to which opposite ends of the release element are secured for applying a controlled tension force to the release element;
the pair of tensioning components being arranged at laterally fixed positions relative to the build plate, and on opposing sides of the build plate;
wherein a tension applied to the release element by the tensioning components is controlled to reduce a separation force required to separate the release element from the new material layer after the new material layer is cured, and further such that the controller controls the pair of tensioning components to enable rotation in opposite rotational directions, to controllably unspool the release element to enable a peel angle of the release element to be maintained constant and non-parallel to a surface of the new material layer, while the release element is peeled from the newly formed material layer.

3. The system of claim 2, wherein the release element comprises a low surface energy release film.

4. The system of claim 3, wherein the low surface energy release film comprises a polytetrafluoroethylene (PTFE) release film.

5. The system of claim 3, wherein the low surface energy release film comprises at least one of a fluorinated ethylene propylene (FEP) polytetrafluoroethylene (PTFE) release film, or a PTFE amorphous fluoroplastic film, or a polymethylpentene film.

6. The system of claim 2, wherein the tensioning components comprise tensioning rollers.

7. The system of claim 3, wherein each said tensioning roller includes an electric motor for controlling rotational movement of its associated said tensioning roller.

8. The system of claim 7, further comprising a pair of idler rollers disposed on opposing sides of the base plate, for assisting in supporting the low surface energy release film and helping to control a peel angle of the low surface energy release film while peeling of the low surface energy release film is occurring.

9. The system of claim 7, wherein each said electric motor comprises an electric stepper motor.

10. The system of claim 9, further comprising an electronic controller for controlling each of the electric stepper motors.

11. The system of claim 2, further comprising a UV light source for curing the new material layer of photo responsive resin.

12. The system of claim 2, further comprising a doctor blade component for assisting in spreading a new quantity of photo responsive resin on the release element to achieve a generally uniform thickness of the new quantity of photo responsive resin.

13. The system of claim 12, wherein the doctor blade component is arranged in a path of movement of the release element.

14. The system of claim 12, wherein the doctor blade component is arranged parallel to a path of movement of the release element, and movable laterally along an axis perpendicular to the path of movement.

15. The system of claim 2, further comprising at least one sensing component for sensing a tension being experienced by the release element while peeling of the release element is occurring.

16. The system of claim 2, further comprising a lifting mechanism for lifting the build plate to assist in peeling the release element from the newly cured material layer.

17. A tensioning system for use in a stereolithography manufacturing application, the system including:
   an electronic controller;
   a build plate for supporting a three dimensional part being formed using a photo responsive resin;
   a base plate;
   a low surface energy release film extending over the base plate, the low surface energy release film configured to receive a quantity of photo responsive resin for forming a new material layer of the three dimensional part;
   a pair of independently controllable, rotational tensioning rollers to which opposite ends of the low surface energy release film are secured for applying a controlled tension force to the low surface energy release film;
   the pair of tensioning rollers being arranged at laterally fixed positions on opposing sides of the build plate;
   a pair of motors for controlling rotational movement of the pair of tensioning rollers in response to signals from the electronic controller;
   the electronic controller controlling the motors to vary a tension force applied by the tensioning rollers during fabrication of the new material layer and release of the new material layer from the low surface energy release film; and
   wherein a peel angle of the low surface energy release film and a tension applied to the low surface energy release film by the tensioning rollers is controlled by the electronic controller controlling the pair of motors to rotate in opposite directions to enable a controlled unspooling of the release film from the pair of tensioning rollers, to maintain the peel angle the same on both sides of the build plate, non-parallel to a surface of the new material layer, and to reduce a separation force required to separate the low surface energy release film from the new material layer when the new material layer is cured and being removed from the low surface energy release film.

18. The system of claim 17, further comprising a pair of idler rollers disposed on opposing sides of the base plate, for assisting in supporting the low surface energy release film and helping to control the peel angle of the low surface energy release film while peeling of the low surface energy release film is occurring.

19. The system of claim 17, wherein the low surface energy release film comprises at least one of:
   a polytetrafluoroethylene (PTFE) release film; and
   a fluorinated ethylene propylene (FEP) polytetrafluoroethylene (PTFE) release film.

* * * * *